US011404817B2

(12) United States Patent
Jacobson et al.

(10) Patent No.: US 11,404,817 B2
(45) Date of Patent: Aug. 2, 2022

(54) SELF-STOPPING ANVIL COAXIAL CABLE SEIZURE CONTACT ASSEMBLY FOR A HYBRID FIBER COAXIAL NETWORK DEVICE

(71) Applicant: ATX Networks (Toronto) Corp., Toronto (CA)

(72) Inventors: Bradford Allen Jacobson, Black Diamond, WA (US); Vito Alberto Orlando, Seattle, WA (US)

(73) Assignee: ATX Networks (Toronto) Corp., Toronto (CA)

( * ) Notice: Subject to any disclaimer, the term of this patent is extended or adjusted under 35 U.S.C. 154(b) by 0 days.

(21) Appl. No.: 17/031,863

(22) Filed: Sep. 24, 2020

(65) Prior Publication Data
US 2021/0218182 A1 Jul. 15, 2021

Related U.S. Application Data

(60) Provisional application No. 62/907,371, filed on Sep. 27, 2019.

(51) Int. Cl.
H01R 13/621 (2006.01)
H01R 24/52 (2011.01)
H01R 9/05 (2006.01)
H01R 4/48 (2006.01)
H01R 103/00 (2006.01)

(52) U.S. Cl.
CPC ........... H01R 13/621 (2013.01); H01R 4/489 (2013.01); H01R 9/0515 (2013.01); H01R 24/52 (2013.01); H01R 2103/00 (2013.01)

(58) Field of Classification Search
None
See application file for complete search history.

(56) References Cited

U.S. PATENT DOCUMENTS 7,318,756 B2 * 1/2008 Mahoney ........... H01R 13/2421
439/63
7,625,247 B1 * 12/2009 Mahoney ............. H01R 9/0527
439/63
2006/0196048 A1 * 9/2006 Pfister .................... H01R 4/489
29/857

* cited by examiner

Primary Examiner — Ross N Gushi
(74) Attorney, Agent, or Firm — Spencer C. Patterson; Grable Martin Fulton PLLC

(57) ABSTRACT

A Network device includes an interface configured to be coupled to a transmission line that carries content and a content processing module. The content processing module includes circuitry configured to route content communicated via the transmission line to one or more secondary network devices. The content processing module further includes a contact assembly. The contact assembly includes an upper housing and a lower housing that define a recessed region therebetween. The contact assembly includes a screw. The head of the screw is disposed above the upper housing and the threaded portion of the screw extends through a threaded opening in the upper housing and into the recessed region. A resilient member of the contact assembly is disposed within the recessed region and has an end that is in mechanical communication with the end of the screw. The contact assembly further includes a plunger assembly. The plunger assembly is disposed below the resilient member and includes a conductive pin disposed therein that is urged by the resilient against center pin of the coaxial connector. Adjustment of the screw facilitates adjusting an amount of force applied by the pin against a center conductor of the transmission line.

14 Claims, 8 Drawing Sheets (SCREW 225 SET FOR COAXIAL CONN INSERTION)

NETWORK DEVICE 100

ENTRY PORTION OF
CONTENT PROCESSING MODULE (110)
(200)

SEIZURE CONTACT ASSEMBLY (400)
w/ UPPER HOUSING (310)

PLUNGER ASSEMBLY
PART OF 400

(SCREW 225 SET FOR
COAXIAL CONN INSERTION)

(SCREW 225 ADJUSTED FOR CONTACT SEIZURE)

SELF-STOPPING ANVIL COAXIAL CABLE SEIZURE CONTACT ASSEMBLY FOR A HYBRID FIBER COAXIAL NETWORK DEVICE

RELATED APPLICATION

This application claims benefit of U.S. Provisional Application No. 62/907,371 filed Sep. 27, 2019, which is incorporated herein in its entirety.

FIELD OF THE INVENTION

This application generally relates to network equipment for the distribution of RF modulated data and audio/video content over a Hybrid Fiber Coaxial (HFC) cable network. In particular, this application describes network equipment having an improved contact assembly interface between the network equipment and the HFC networks coaxial cable.

DESCRIPTION OF RELATED ART

A Hybrid Fiber Coax network device may correspond to a cast housing with coaxial cable ports to form an interface between the transmission line cable and the electronics within the housing. The transmission line may correspond to a coaxial cable having a center conductor that is surrounded by an insulator. The insulator is in turn is surrounded by an aluminum conductor that forms a shield around the dielectric insulator and center conductor.

Installation of such a network device typically involves the attachment of a coaxial cable connector fitting having a male center pin that attaches to the center conductor of the coaxial cable to extend into the housing and mate with the network device via the female seizure contact assembly.

The seizure contact assembly may include a structure for forming a durable electrical connection with the center pin conductor of the coaxial cable connector fitting. The structure may include a non-conductive base, a conductive anvil contact and a screw. When fitted, the coax cable connector center pin extends into the assembly between the base and conductive anvil contact whereby the screw exerts a positive stop force to the anvil against the connector center conductor pin thereby providing physical retention and an electrical connection of the center conductor and at another end of the conductive anvil being electrically connected to electrical circuitry located within the housing.

As HFC cable networks expand radio frequency spectrum beyond 2 GHz it is imperative to provide a craft insensitive means to couple the coaxial cable to the network device to reliably maintain an impedance match and low attenuation between the coaxial cable and the network devices electronics over extreme temperature variations. Unfortunately, the connection that is formed may be comprised by traditional seizure mechanisms that rely upon a direct contact with a seizure screw and thus the integrity is subjective to the pressure a craft person applies when tightening the seizure screw. For example, too little pressure on the center conductor pin can allow slight movement through vibration causing Radio Frequency (RF) impairments. Applying too much pressure often damages the center conductor pin by scoring or denting the pin again resulting in RF signal impairments. Hence the critical performance of the network is compromised. Traditional seizure mechanisms are also prone to mechanical creep which allows the contact force to decrease over time. This will result in insufficient contact pressure or movement of signal conductor. Decreased force or contact movement results in RF signal impairments.

SUMMARY

A network device includes a content processing module and an interface configured to be coupled to a coaxial cable transmission line that carries AC power and RF modulated content. The content processing module includes circuitry configured to route content communicated via the coaxial cable transmission line to one or more secondary network devices. The content processing module further includes a self-stopping anvil seizure contact assembly connecting to the coaxial cable transmission line. The contact assembly includes an upper housing and a lower housing that define a recessed region therebetween. The contact assembly includes a screw. The head of the screw is disposed above the upper housing and the threaded portion of the screw extends through a threaded opening in the upper housing and into the recessed region. A resilient member of the contact assembly is disposed within the recessed region and has an end that is in mechanical communication with the end of the screw. The contact assembly further includes a plunger assembly. The plunger assembly is disposed below the resilient member and includes a conductive pin disposed therein that is urged by the resilient member through an opening in the lower housing. Adjustment of the screw facilitates adjusting an amount of pressure applied by the pin against a center conductor of the transmission line.

The self-stopping anvil seizure contact assembly provides one or more of the following advantages to maximize RF performance, reliability and to minimize craftsperson errors which reduce performance and reliability. The assembly provides a controlled contact pressure on the coaxial cable connector center pin conductor, which is insensitive to dimensional variations or component creep. The engagement screw never fully compresses the resilient member, which prevents the user from applying excessive force on the coaxial cable connector center pin conductor. The assembly allows removal of the coaxial cable connector without removing any of the network device modules. The assembly allows removal of the network device AC entry (200) subsection without removal of the coaxial cable connector. The assembly provides sufficient pressure on the center pin of the coaxial cable connector to establish a gastight contact, which prevents corrosion from forming in the contact area, assuring long term performance of the connector system. The screw and resilient member elements are not part of the electrical path for the ac or RF signal. This electrical isolation prevents these elements from distorting the RF signal characteristics.

BRIEF DESCRIPTION OF THE DRAWINGS

FIG. 5 illustrates the primary components of the self-stopping anvil seizure contact assembly (400) that may be used to secure the center pin conductor of a coaxial cable connector to the network device;

DETAILED DESCRIPTION

Figure 1:
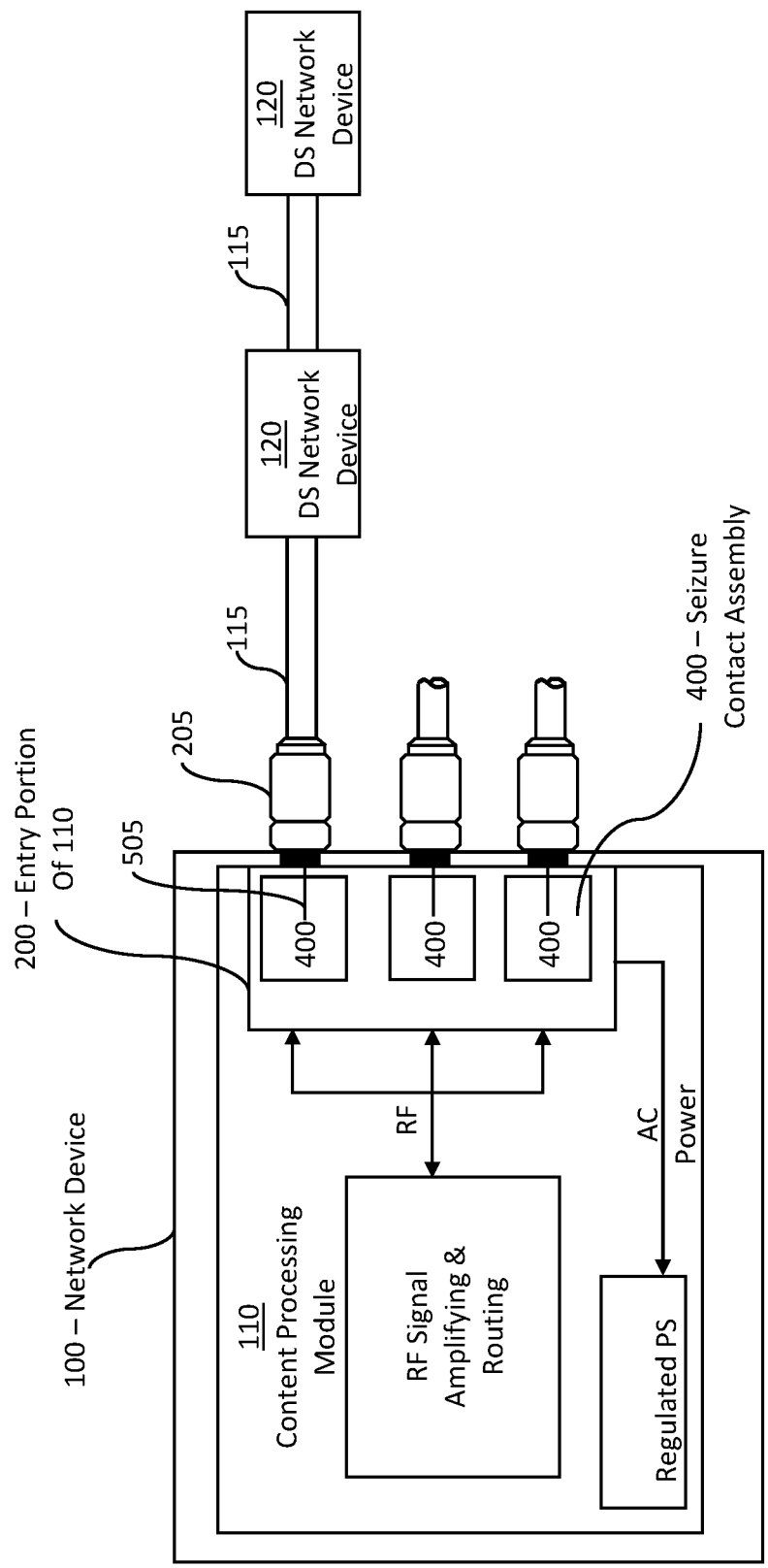
FIG. 1 illustrates an exemplary network device coupled to a provider network.

FIG. 1 illustrates an environment in which an exemplary network device 100 according to an embodiment may be utilized. In an implementation, the network device 100 may correspond to an optical/RF node or distribution amplifier for amplifying and redirecting signals communicated over a transmission line, such as the coaxial cable 115 provided by a cable operator, to one or more downstream network devices 120.

Figure 2:
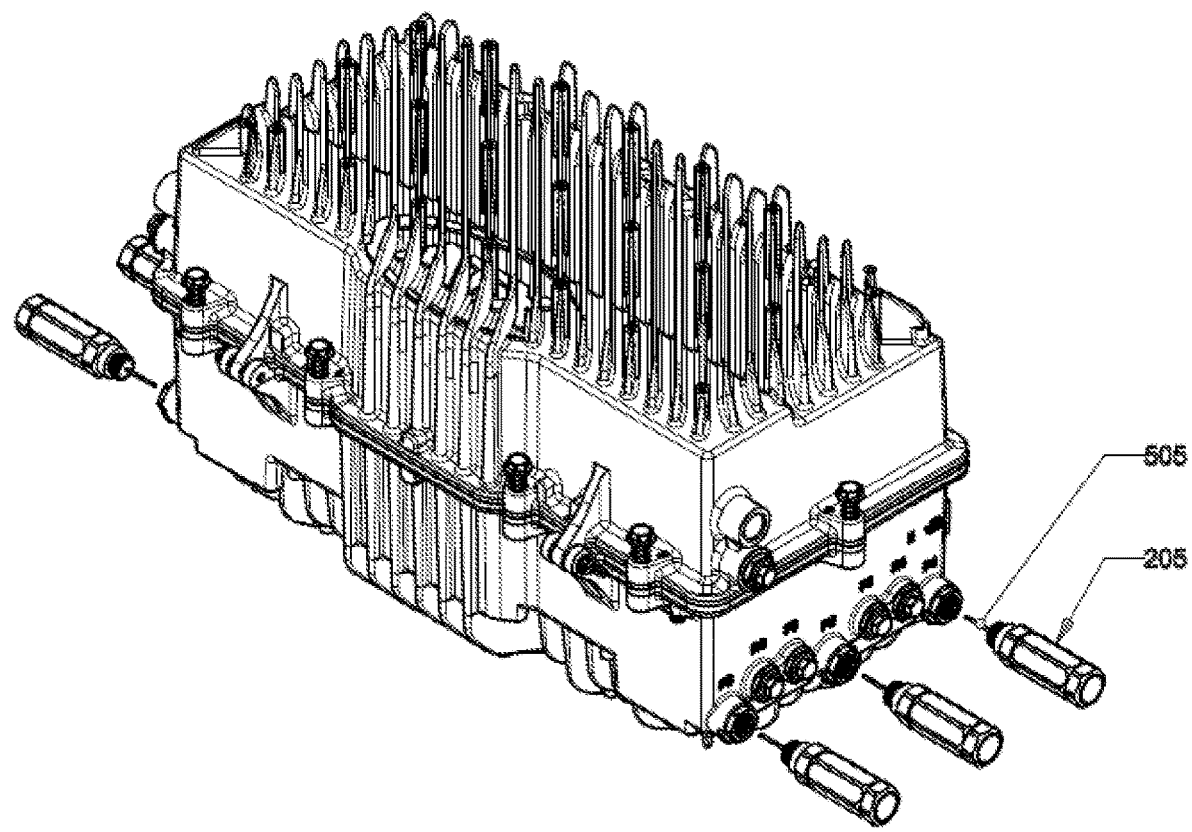
FIG. 2 illustrates a detailed view of the exemplary network device.

FIG. 2 illustrates a more detailed view of the exemplary network device 100. The network device 100 may be configured to receive a plurality of fittings 205 to facilitate coupling the network device 100 to the cable 115 and to the downstream network devices 120. The fittings 205 may correspond to coaxial cable fittings such as KS-type fittings. In this regard, the fittings 205 may have a male center pin 505 that attaches to the center conductor of the cable 115.

The network device 100 may include a content processing module 110. In an exemplary implementation, the content processing module 110 may include circuitry for amplifying and routing signals communicated via the cable 115 to the downstream network devices 120. The content processing module 110 may also include power regulation circuitry that converts an unregulated voltage provided on the cable 115 to a regulated voltage that is in turn utilized to power other circuitry of the content processing module 110 and/or the network device 100. (See FIG. 1)

As described in more detail below, the content processing module 110 may include a contact assembly 400 (FIGS. 4-7) for forming an electrical connection between the center pin 505 of a coax cable connector 205 connected to the center conductor of the cable 115 and circuitry of the content processing module 110. A head of a screw 225 that is part of contact assembly 400 may or may not be accessible outside of the content processing module 110, as illustrated in FIG. 3A.

Figure 3A:
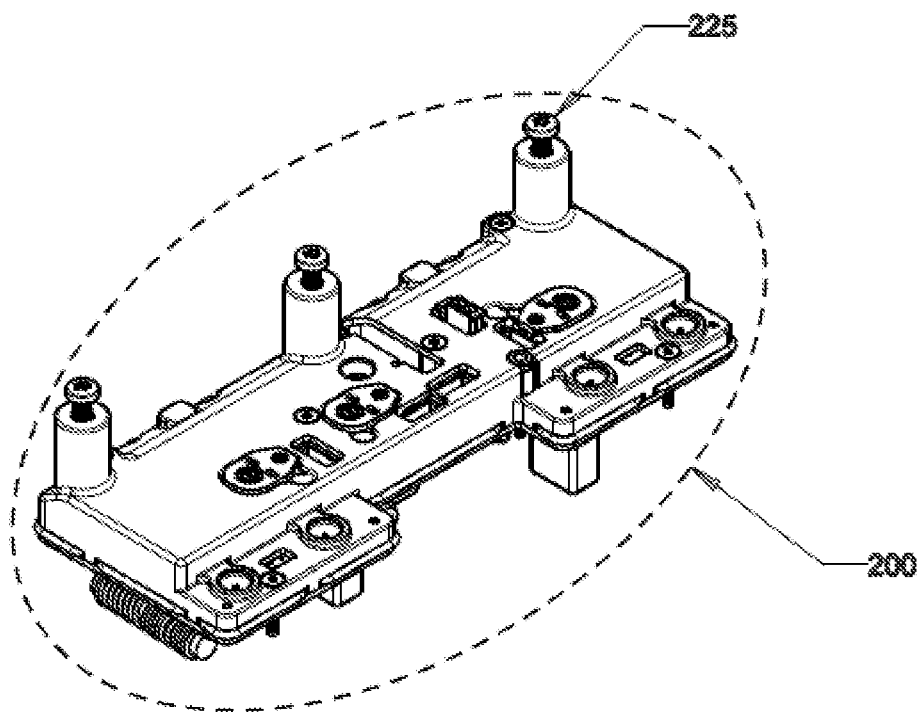
FIG. 3A illustrates an exemplary entry portion (200) of the content processing module of the exemplary network device.
Figure 3B:
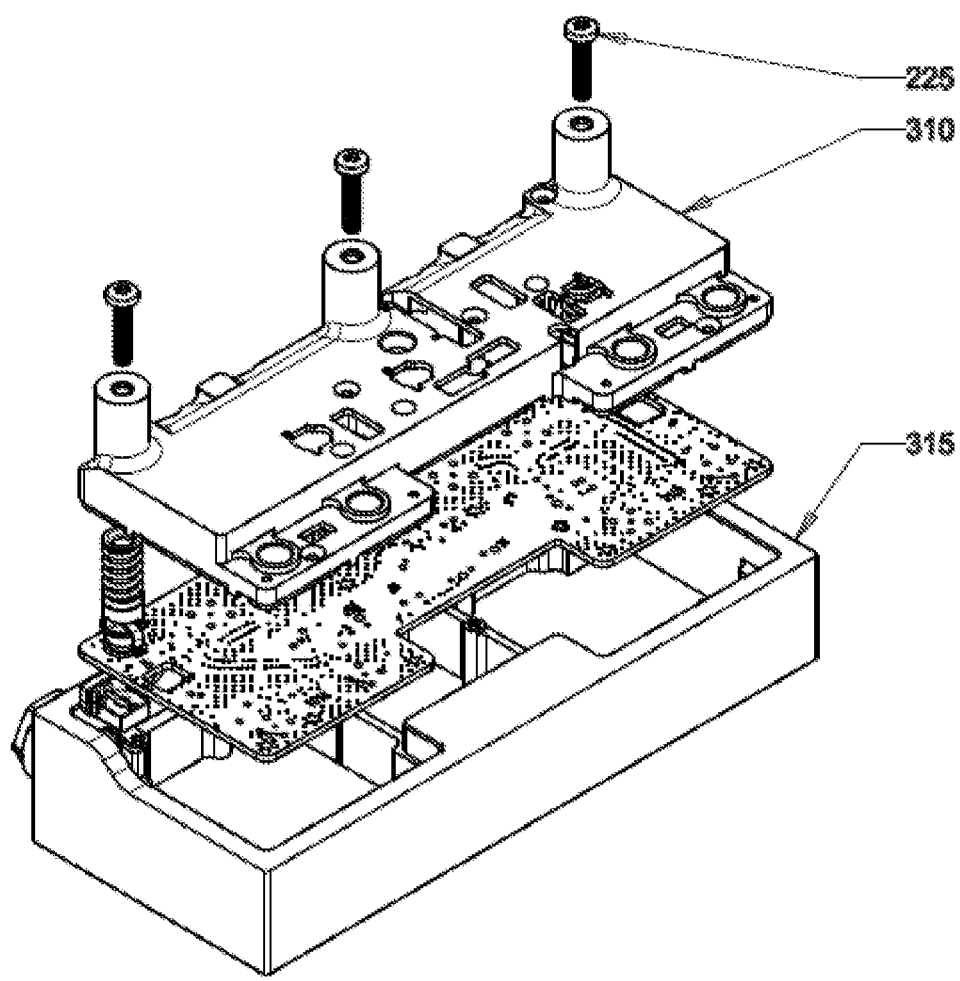
FIG. 3B illustrates and exploded view of 200 and lower housing (315).
Figure 6:
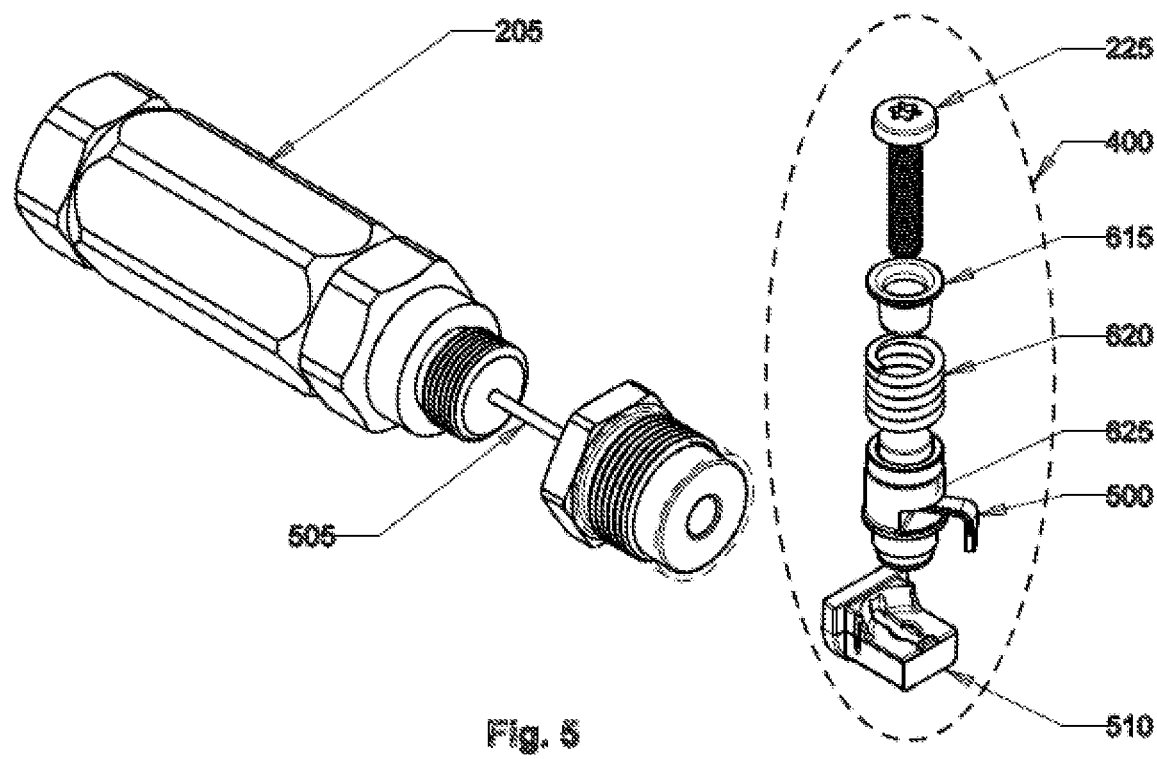
FIG. 6 illustrates a detail cross-sectional view of the self-stopping anvil seizure contact assembly (400) that may be utilized with the content processing module to secure the center pin conductor of a coaxial cable connector to the network device.
Figure 6:
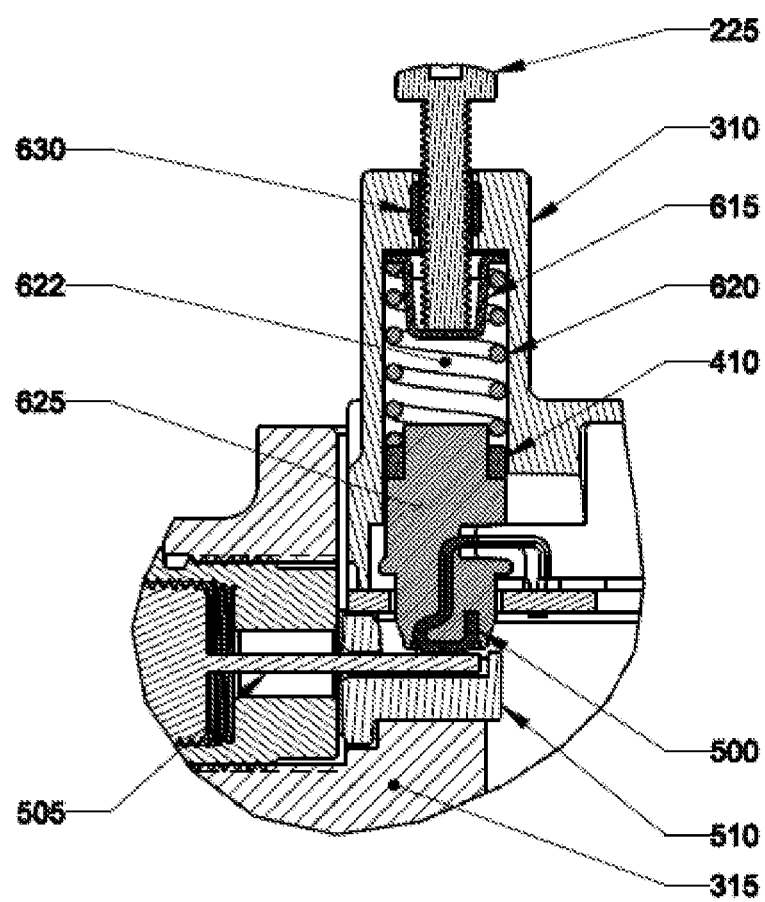
Figure 7:
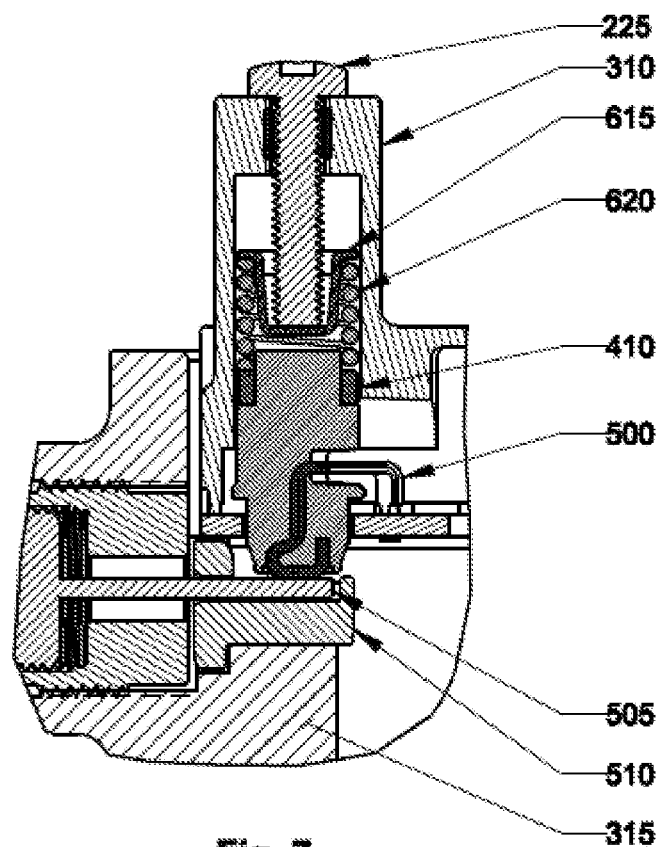
FIG. 7 illustrates the embodiment of the self-stopping anvil seizure contact assembly (400) in an adjusted configuration.

FIG. 3A illustrates a perspective view of an exemplary entry portion (200) of the content processing module 110 and FIG. 3B illustrates an exploded view of the content entry portion (200) of the processing module 110. As illustrated, the entry portion (200) contains an upper housing 310 which secures the seizure mechanism and at least a portion of the control circuitry. When this entry section is mated with the lower housing (315) as shown in FIGS. 6 & 7 the circuitry is encapsulated in the content processing module. It is recognized that other methods may be used to support the seizure contact assembly (400) and combine the different elements of the processing module than what is illustrated here.

Figure 4A:
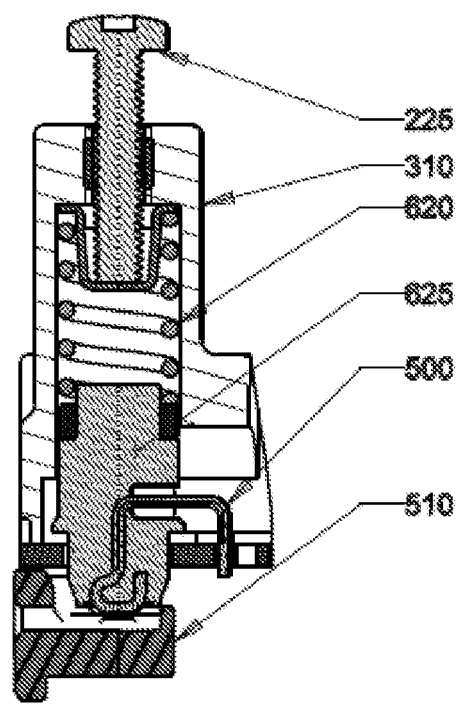
FIG. 4A illustrates a cross-section of the self-stopping anvil seizure contact assembly.

FIG. 4A illustrates a cross-section of the self-stopping anvil seizure contact assembly (400) contained within the entry portion (200) of the content processing module (110). The contact assembly 400 facilitates forming an electrical connection between circuitry of the content processing module 110 and, the center pin 505 of a coax cable connector 205 connected to the center conductor of the cable 115 (See FIG. 5).

Figure 4B:
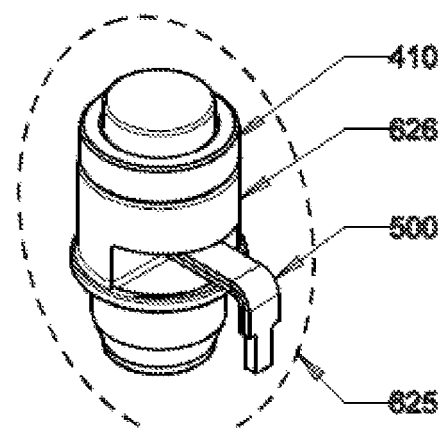
FIG. 4B illustrates the plunger assembly (625).

FIG. 4B illustrates the plunger assembly (625) contained within the seizure contact assembly (400). The plunger assembly 625 may be disposed below the resilient member 620. The plunger assembly 625 may include a body 626, an RF optimization device (410), and a conductive pin 500. The body 626 supports and contains the pin 500. The body 625 may be formed from an insulating/non-conductive material to prevent forming a short circuit between the pin 500 and the housing 310, 315 or seizure elements 410 and 620, see FIG. 6. The body 626 also establishes the requisite impedance characteristics for proper transmission of the RF signal. The contact assembly 400 may also contain a RF optimization device (410), not electrically connected to the cable (115) and the associated HFC cable network, but to optimize the radio frequency spectrum beyond 2 GHz of the seizure mechanism.

FIG. 5 illustrates all of the functional elements of Seizure Contact Assembly (400) as shown within the dotted ellipse. This also shows the coaxial connector (205) which contains the center pin (505) that interfaces with assembly 400. The various possible implementations of housing and support for this mechanism are not shown for clarity.

FIG. 6 illustrates the detail implementation of contact assembly 400 that may be utilized with the content processing module 110. The contact assembly 400 may include an upper housing 310, a lower housing 315, a screw 225, a resilient member 620, and a plunger assembly 625. In the implementation, the upper housing 310 and the lower housing 315 may form an integral part of the content processing module 110. In alternate embodiments, the contact assembly 400 may be a separate component with a unique housing structure that is fitted to the content processing module 110.

The screw 225 may include a head and a threaded portion. The head may be disposed above the upper housing 310. The threaded portion may extend through an opening 630 in the upper housing 310 and into a recessed region 622 formed between the upper housing 310 and lower housing 315. The opening 630 may be threaded to mesh with the threaded portion of the screw 225. In some implementations, the opening 630 may include a component for preventing the screw 225 from inadvertently loosening.

The resilient member 620 may be disposed within the recessed region 622. In an implementation, the resilient member 620 may correspond to a coil spring. The top end of the resilient member 620 may be in mechanical communication with the end of the screw 225 such that insertion of the screw 225 into the recessed region 622 compresses the resilient member 620.

A cap 615 may be disposed between the resilient member 620 and the end of the screw 225. The cap 615 may include a flange that overlaps the top of the resilient member 620 and a cavity for receiving the end of the screw 225.

The pin 500 may be in electrical contact with circuitry of the content processing module 110 to facilitate routing of power and RF signal carried by the center pin 505 of a coax cable connector 205 and the center conductor of the cable 115 to the circuitry of the content processing module 110. The pin 500, or at least a portion of the pin, may pass through an opening in the operational PCBA to facilitate forming an electrical connection with the center pin 505 of a coax cable connector 205.

As illustrated in FIG. 7, adjustment of the screw 225 facilitates compressing the resilient member, thereby increasing an amount of force applied by the resilient member to the plunger assembly (625). This in turn forces the pin 500 against the conductor 505, which is held in place by, for example, a non-conductive base 510. The force of the pin 500 against the connector pin 505 will be sufficient to establish a gas tight connection. However, the resilient nature of the force applied by the pin 500 ensures that the force applied to the connector pin 505 remains relatively constant over the life of the network device 100. Without this continuous force, the connection formed between the pin 500 and the connector pin 505 may deteriorate over time due, for example, to subtle movements of the conductor that may occur naturally or during maintenance operations, and/or from corrosion that may form on the connector pin 505 and/or the pin 500 over time. The continuous force applied by the pin 500 according to the embodiment ensures a long-lasting connection. The screw 225 never fully compresses the resilient member (e.g., as a result of the hardstop created when the head of the screw 225 contacts the upper housing 310), which prevents the user from applying excessive force on the coaxial cable connector center pin conductor.

While network device and component used therein have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

ITEM NUMBERS AND THEIR DESCRIPTIONS

100 Network Device
110 Content Processing Module
115 Coaxial Cable Provided by Customer
120 Downstream Network Device
200 Entry Portion of 110
205 Coaxial cable connector
225 Seizure Adjustment Screw
310 Upper Housing of 200
315 Lower Housing
400 Seizure Contact Assembly
410 RF optimization device
500 Conductive Pin of the Seizure Assembly 400
505 Center Pin of 205
510 Support Dielectric of 400
615 Cap interfacing between 225 & 620
620 Resilient Member of 400
622 Recessed Region that holds 400.
625 Plunger Assembly of 400
626 Body of Plunger Assembly 625
630 Opening in 310 that Supports 225

What is claimed is:

1. A network device comprising:
an interface configured to be coupled to a transmission line that carries content;
a content processing module that includes circuitry configured to route content communicated via the transmission line to one or more secondary network devices, and a contact assembly that includes:
an upper housing and a lower housing that define a recessed region therebetween;
a screw having a head disposed above the upper housing and a threaded portion that extends through a threaded opening in the upper housing and into the recessed region;
a resilient member disposed within the recessed region having an end in mechanical communication with an end of the screw; and
a plunger assembly disposed below the resilient member having a conductive pin disposed therein that is configured to be urged by the resilient member through an opening in an operational PCB, wherein adjustment of the screw facilitates adjusting an amount of force applied by the pin against a center conductor of the transmission line.

2. The network device according to claim 1, wherein the pin is in electrical contact with circuitry of the content processing module to facilitate routing of content carried by the transmission line to the circuitry.

3. The network device according to claim 1, wherein the screw insertion depth is constrained by a hardstop in the assembly configured to restrict the screw from fully compressing the resilient member and creating excessive loading on the center pin of a coaxial connector.

4. The network device according to claim 1, further comprising a cap disposed above the resilient member configured to receive the end of the screw to facilitate compression of the resilient member by the screw.

5. The network device according to claim 1, wherein the cap defines a cavity configured to receive the screw.

6. The network device according to claim 1, wherein a plunger body of the plunger assembly is made of a non-conductive material.

7. The network device according to claim 1, wherein the resilient member comprises a coil spring.

8. An electrical contact assembly that includes: a housing;
a screw having a threaded portion that extends through a threaded opening in the housing and into an interior space of the housing;
a resilient member disposed within the interior space having an end in mechanical communication with an end of the screw; and
a plunger assembly disposed below the resilient member having a conductive pin disposed therein that is configured to be urged by the resilient member against a center pin of a coaxial connector, wherein adjustment of the screw facilitates adjusting an amount of force capable of being applied by the pin.

9. The electrical contact assembly according to claim 8, wherein the electrical contact assembly is configured to be inserted into a housing of a circuit module, wherein when inserted the pin is configured to form an electrical connection with circuitry of the circuit module.

10. The electrical contact assembly according to claim 8, wherein the plunger assembly includes a retainer to limit an amount by which the pin passes through the opening.

11. The electrical contact assembly according to claim 8, further comprising a cap disposed above the resilient member configured to receive the end of the screw to facilitate compression of the resilient member by the screw.

12. The electrical contact assembly according to claim 11, wherein the cap defines a cavity configured to receive the screw.

13. The electrical contact assembly according to claim 8, wherein the plunger is made of a non-conductive material.

14. The electrical contact assembly according to claim 8, wherein the resilient member is a coil spring.

\* \* \* \* \*